United States Patent
Ho et al.

(10) Patent No.: US 8,436,681 B2
(45) Date of Patent: May 7, 2013

(54) VOLTAGE REGULATION CIRCUIT

(75) Inventors: Duen-Yi Ho, New Taipei (TW);
Chun-Jen Chen, New Taipei (TW);
Wei-Chieh Chou, New Taipei (TW);
Tsung-Sheng Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 348 days.

(21) Appl. No.: 13/008,037

(22) Filed: Jan. 18, 2011

(65) Prior Publication Data
US 2012/0176110 A1 Jul. 12, 2012

(30) Foreign Application Priority Data
Jan. 7, 2011 (TW) .............................. 100100735 A

(51) Int. Cl.
*G05F 1/40* (2006.01)
(52) U.S. Cl.
USPC ............................................ 330/10; 323/283
(58) Field of Classification Search ............ 330/10, 330/207 A, 251, 136; 331/34, 57, 74, 75, 331/177 R; 323/235, 241, 272, 282–288, 323/322
See application file for complete search history.

(56) References Cited

U.S. PATENT DOCUMENTS

| | | | | |
|---|---|---|---|---|
| 5,943,227 A * | 8/1999 | Bryson et al. | ................... | 363/95 |
| 6,300,826 B1 * | 10/2001 | Mathe et al. | ..................... | 330/10 |
| 6,441,597 B1 * | 8/2002 | Lethellier | ..................... | 323/282 |
| 6,469,481 B1 * | 10/2002 | Tateishi | ........................ | 323/282 |
| 6,597,159 B2 * | 7/2003 | Yang | ............................ | 323/283 |
| 7,068,096 B2 * | 6/2006 | Chu | ............................... | 330/10 |
| 7,417,413 B2 * | 8/2008 | Noma et al. | .................. | 323/285 |

* cited by examiner

*Primary Examiner* — Rajnikant Patel
(74) *Attorney, Agent, or Firm* — Altis Law Group, Inc.

(57) ABSTRACT

A voltage regulating circuit includes a pulse width modulation controller, a current sense circuit, a voltage feedback circuit, and a gain-and-bias circuit. The current sense circuit includes an inductor and a capacitor. The voltage feedback circuit includes first and second resistors. The gain-and-bias circuit includes an operational amplifier. A first terminal of the capacitor is connected to an inverting input terminal of the operational amplifier through a third resistor. A second terminal of the capacitor is connected to a non-inverting input terminal of the operational amplifier through a fourth resistor. The inverting input terminal of the amplifier is connected to an output terminal of the operational amplifier through a fifth resistor. The non-inverting input terminal of the operational amplifier is grounded through a sixth resistor. The output terminal of the operational amplifier is connected to the node between the first and second resistors through a seventh resistor.

4 Claims, 1 Drawing Sheet

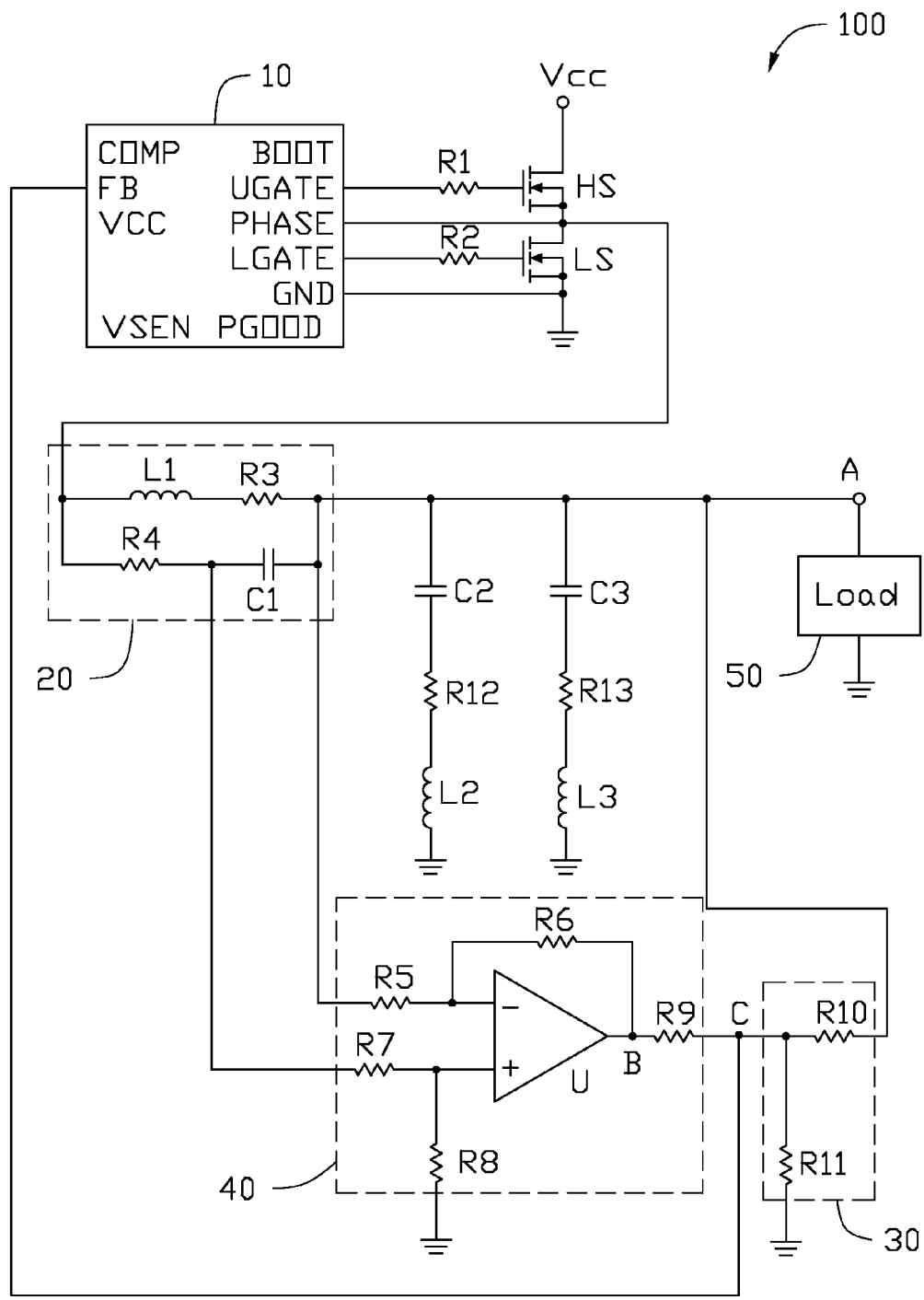

VOLTAGE REGULATION CIRCUIT

BACKGROUND

1. Technical Field

The present disclosure relates to a voltage regulation circuit.

2. Description of Related Art

In some electronic devices, one kind of voltage regulator for providing power to the components, such as central processing units, has an adaptive voltage positioning (AVP) function, which can adjust an output voltage according to load current. However, this kind of voltage regulator is very expensive. Another kind of voltage regulator is cheaper, however it does not have the AVP function.

BRIEF DESCRIPTION OF THE DRAWING

Many aspects of the present embodiments can be better understood with reference to the following drawing. The components in the drawing are not necessarily drawn to scale, the emphasis instead being placed upon clearly illustrating the principles of the present embodiments. Moreover, in the drawing, all the views are schematic, and like reference numerals designate corresponding parts throughout the several views.

The drawing is a circuit diagram of an embodiment of a voltage regulation circuit.

DETAILED DESCRIPTION

The disclosure, including the accompanying drawing, is illustrated by way of example and not by way of limitation. It should be noted that references to "an" or "one" embodiment in this disclosure are not necessarily to the same embodiment, and such references mean at least one.

Referring to the drawing, an embodiment of a voltage regulation circuit 100 includes a pulse width modulation (PWM) controller 10, a first field effect transistor (FET) HS, a second FET LS, a current sense circuit 20, a voltage feedback circuit 30, and a gain-and-bias circuit 40. In one embodiment, the PWM controller 10 is an L6728 PWM controller.

The current sense circuit 20 includes an inductor L1, two resistors R3 and R4, and a capacitor C1. The voltage feedback circuit 30 includes two resistors R10 and R11. The gain-and-bias circuit 40 includes an operational amplifier U and five resistors R5-R9. The voltage regulating circuit 100 further includes four resistors R1, R2, R12, and R13, two capacitors C2 and C3, and two inductors L2 and L3. In one embodiment, a resistance of the resistor R5 is equal to a resistance of the resistor R7, and a resistance of the resistor R6 is equal to a resistance of the resistor R8.

The PWM controller 10 is used to drive the first FET HS and the second FET LS, and output voltage to a load 50, such as a central processing unit, and then the voltage feedback circuit 30 feeds back the voltage to the PWM controller 10. The feedback circuit falls within well-known technologies, and is therefore not described in greater detail here. For achieving an adaptive voltage positioning (AVP) function, the voltage regulation circuit 100 also includes the gain-and-bias circuit 40 between the current sense circuit 20 and the voltage feedback circuit 30.

A high driving pin UGATE of the PWM controller 10 is connected to a gate of the first FET HS through the resistor R1. A low driving pin LGATE of the PWM controller 10 is connected to a gate of the second FET LS through the resistor R2. A drain of the first FET HS is connected to a voltage terminal Vcc. A source of the first FET HD is connected to a drain of the second FET LS, connected to a phase pin PHASE of the PWM controller 10, and connected to the current sense circuit 20. A grounded pin GND of the PWM controller 10 is grounded. A feedback pin FB of the PWM controller 10 is connected to the voltage feedback circuit 30. Other pins of the PWM controller 10 are connected to other peripheral circuits, which fall within well-known technologies, and are therefore not described here.

A first terminal of the inductor L1 is connected to the phase pin PHASE of the PWM controller 10. A second terminal of the inductor L1 is connected to an output voltage terminal A of the load 50 through the resistor R3. The resistor R4 and the capacitor C1 are connected in series between the first terminal of the inductor L1 and the output voltage terminal A of the load 50. The capacitor C2, the resistor R12, and the inductor L2 are connected in series between the output voltage terminal A of the load 50 and ground. The capacitor C3, the resistor R13, and the inductor L3 are connected in series between the output voltage terminal A of the load 50 and ground. The output voltage terminal A of the load 50 is connected to an inverting input terminal of the operational amplifier U through the resistor R5. A node between the resistor R4 and the capacitor C1 is connected to a non-inverting input terminal of the operational amplifier U through the resistor R7. The inverting input terminal of the operational amplifier U is connected to an output terminal B of the operational amplifier U through the resistor R6. The non-inverting input terminal of the operational amplifier U is grounded through the resistor R8. The output terminal B of the operational amplifier U is connected to the output voltage terminal A of the load 50 through the resistors R9 and R10 in that order. A first terminal of the resistor R11 is connected to a node C between the resistors R9 and R10. A second terminal of the resistor R11 is grounded. The node C is also connected to the feedback pin FB of the PWM controller 10.

The voltage at the output voltage terminal A is Vout. The output current or the current to the load 50 is Iout. Current passing through the inductor L1 is IL1. A voltage at the output terminal B of the operational amplifier U is Vb. A voltage at the node C is Vc. In use, if the current Iout is increased, the current IL1 is correspondingly increased, which makes a voltage between the two terminals of the capacitor C1 increased, therefore the voltage Vb is correspondingly increased. At this time, Vb>Vc, current passing through the resistor R9 is passing from the output terminal B to the node C. The voltage at the node C, namely a voltage of the feedback pin FB of the PWM controller 10, is constant, therefore current passing through the resistor R10 is decreased, which makes the voltage Vout correspondingly decrease.

If the current Iout is decreased, the current IL1 is correspondingly decreased, which makes the voltage between two terminals of the capacitor C1 decreased, therefore the voltage Vb is correspondingly decreased. At this time, Vb<Vc, current passing through the resistor R9 is passing from the node C to the output terminal B. The voltage at the node C is constant, therefore the current passing through the resistor R10 is increased, which makes the voltage Vout correspondingly increase. Accordingly, the gain-and-bias circuit 40 can adjust the output voltage Vout according to the load current Iout, namely the gain-and-bias circuit 40 has the AVP function. Furthermore, the gain-and-bias circuit 40 need only use inexpensive components, which can save on costs.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A voltage regulation circuit comprising:
   a pulse width modulation (PWM) controller;
   a current sense circuit comprising an inductor and a capacitor connected to the inductor in parallel, wherein two terminals of the inductor are respectively connected to a phase pin of the PWM controller and an output voltage terminal;
   a voltage feedback circuit comprising a first resistor and a second resistor connected to the first resistor in series between the output voltage terminal and ground, wherein a node between the first and second resistors is connected to a feedback pin of the PWM controller; and
   a gain-and-bias circuit comprising an operational amplifier and third to seventh resistors, wherein a first terminal of the capacitor is connected to an inverting input terminal of the operational amplifier through the third resistor, a second terminal of the capacitor is connected to a non-inverting input terminal of the operational amplifier through the fourth resistor, the inverting input terminal of the operational amplifier is connected to an output terminal of the operational amplifier through the fifth resistor, the non-inverting input terminal of the operational amplifier is grounded through the sixth resistor, the output terminal of the operational amplifier is connected to the node between the first and second resistors through the seventh resistor.

2. The voltage regulation circuit of claim 1, further comprising an eighth resistor connected between the inductor and the output voltage terminal, and a ninth resistor connected to the capacitor in series.

3. The voltage regulation circuit of claim 1, wherein a resistance of the third resistor is equal to a resistance of the fourth resistor, a resistance of the fifth resistor is equal to a resistance of the sixth resistor.

4. The voltage regulation circuit of claim 1, further comprising a first field effect transistor (FET) and a second FET, wherein a high driving pin of the PWM controller is connected to a gate of the first FET through an eighth resistor, a low driving pin of the PWM controller is connected to a gate of the second FET through a ninth resistor, a drain of the first FET is connected to a voltage terminal, a source of the first FET is connected to a drain of the second FET, connected to a phase pin of the PWM controller, and connected to the inductor of the current sense circuit.

* * * * *